ADJUSTABLE GUIDE MEANS FOR A HELICAL SCAN TAPE RECORDER
Filed Nov. 26, 1962
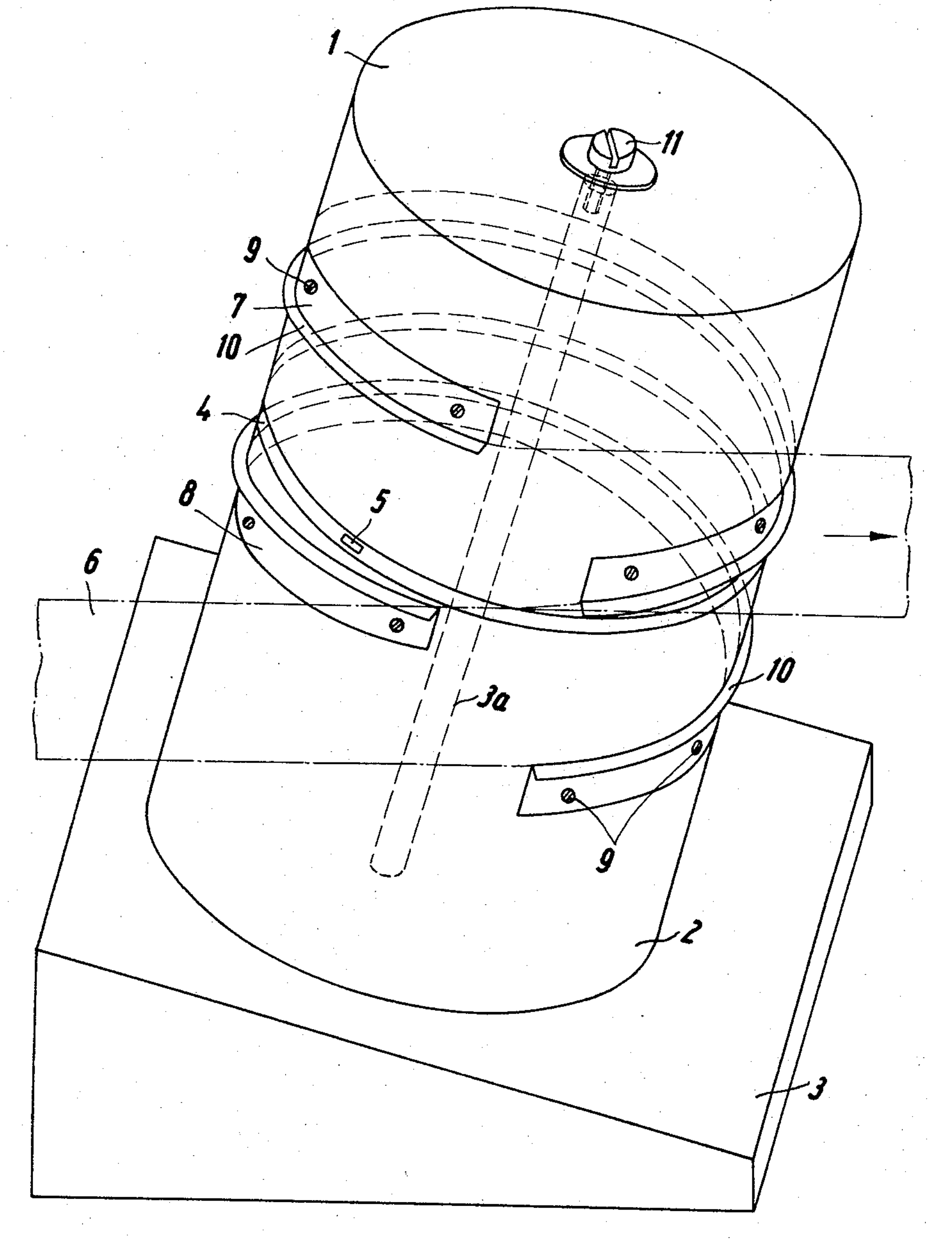
Inventor:
Wolfgang Rank United States Patent Office 3,354,269

Patented Nov. 21, 1967

3,354,269

ADJUSTABLE GUIDE MEANS FOR A HELICAL SCAN TAPE RECORDER

Wolfgang Rank, Kronach, Upper Franconia, Germany, assignor to Loewe Opta Aktiengesellschaft, Berlin, Germany, a company of Germany Filed Nov. 26, 1962, Ser. No. 242,576
Claims priority, application Germany, Nov. 30, 1961, L 40,586
2 Claims. (Cl. 179—100.2)

This invention relates to a tape recording and reproducing device of television signals.

In a known device for magnetic recording and reproducing of television signals a record tape runs obliquely onto one of two fixed cylinders disposed to abut coaxially and having the same diameter, between which cylinders a magnetic-recording-head carrier fitted with one or several magnetic record/playback heads rotates. The diameter of the carrier is chosen so that the operative gaps of the heads in rotating describe a circle of about the diameter of the cylinders. The tape encloses the cylinders and the head carrier in a whole helical turn, so that the tape running onto and off the cylinders maintains its direction of running. As a result of the relative motion of the tape over the cylinders and of the rotating magnetic heads there is produced for each rotation of the magnetic-head carrier one magnetic track running obliquely to the longitudinal direction of the tape. In order that recorded television signals can be correctly reproduced at all times, provision must be made for the tape always to enclose the cylinders and the magnetic-head carrier in the same manner as during the recording process. Were the head carrier in reproducing to depart from the prescribed track or in a given case touch a neighbouring track, disturbances in the image reproduced would be unavoidable. In addition any slipping of the tape in the direction of the cylinder axis—e.g. in reproducing—must be prevented; this especially happens in slightly distorted tape, which swings obliquely to its direction of running. Furthermore, in the case where the cylinders are arranged on an approximately vertical axis when the recording device is re-started undersirable tape tangling may arise.

To avoid these disadvantages it is possible to fasten on the outside surface of the cylinders guiding means which restrict any movement of the tape in the direction of the cylinder axis. These guiding means consist of two stops, of which one each encircles a cylinder in approximately one helical turn. The stops are in the axial direction of the cylinders mutually disposed so that the tape is guided between the mutally facing edges of the stops. Because of the fact that video tapes of a certain nominal size are in practice of different width—every producer allows other tolerances—disturbances in the image reproduced will arise. Accordingly, one object of the invention is to provide a measure enabling the distance between the stops to be adjustable.

According to the invention by a simple turn of one cylinder in relation to the other fixed cylinder the width of the guide-way for the recording medium or tape between the two guide rails can be decreased or increased, which within certain limits enables the guiding means to be adapted to tapes of different widths.

Further details of the invention, and its principle of working, are explained in greater detail with the help of the embodiment shown in the accompanying drawing.

References 1 and 2 designate two coaxially arranged cylinders, one of which is fixed on a base 3; between such cylinders a magnetic-head carrier-plate 4 is suspended rotatably about an axial bolt 3*a* which holds the cylinders in a spaced apart relation. The diameter of plate 4 equals approximately the diameter of the cylinders 1 and 2. On the circumference of plate 4 one or several magnetic record/playback heads 5 are disposed with their operative gaps lying flush with the outside surface of the cylinders. For guiding a magnetic tape 6, which is laid in one helical loop round the cylinders, two guide rails 7, 8, one associated with each cylinder, serve. The guide rails 7, 8 pass round the cylinders helically and are fastened to the cylinders with screws 9.

The tape 6 is guided between the mutually facing edges of the guide rails, which edges in accordance with the embodiment are widened into a flange 10. This flange 10 is intended to prevent the tape from sliding downwardly on vertically disposed cylinders in the absence of tension and/or of drive on the tape and, when the drive is later switched on, to prevent undesirable tangling. In order that the distance between the guide rails, corresponding to the width of the tape, may be adapted to tapes of different widths, one of the cylinders, e.g. 1, is appropriately rotatable in relation to the other, fixed cylinder after the loosening of a screw 11 which is screwed into an internal thread of said bolt 3*a* and which otherwise holds bolt 3*a* and cylinder 1 axially together. In the arrangement of the guide rails illustrated an anti-clockwise turn on the upper cylinder 1 narrows, a clockwise turn widens the guideway for the tape.

Instead of one-piece guide rails individual guide parts can also be incorporated. It is also possible, with a view to reducing friction between the edges of the guide rails, to provide recesses on the guide rails and/on their flanges 10. A suitable material for the guide rails is abrasion-resisting steel or in given cases an appropriate plastic material with a surface as smooth as possible.

What I claim is:

1. A tape recording and reproducing device for television signals, comprising a base, a pair of cylinders, a central bolt, a screw, driving means for said tape, tape guide means fastened on said cylinders, and a magnetic head; said cylinders having the same diameter, a first of said cylinders being mounted on said base and the second cylinder being coaxially arranged in a spaced apart relation by said central bolt, on which said second cylinder is fastened by way of said screw, said driving means wind said tape helically around said cylinders, said magnetic head being mounted on said bolt to rotate within the slot between said cylinders and to coact with said tape, said tape guide means consist of two stops, each of which being fixed on one of said cylinders helically in one turn, the distance between said stops corresponds approximately to the tape width, said distance being continuously adjustable by loosening said screw and by turning said second cylinder around its axis in relation to said first cylinder.

2. A device as claimed in claim 1, wherein said first cylinder supports said axial bolt and wherein the front surface of said bolt is provided with an axial internal thread for taking up said screw holding said second cylinder on said bolt.

References Cited

UNITED STATES PATENTS

| | | | |
|---|---|---|---|
| 2,773,120 | 12/1956 | Masterson | 179—100.2 |
| 3,042,756 | 6/1962 | Buslik | 179—100.2 |
| 3,152,223 | 10/1964 | Wessels | 179—100.2 |
| 3,157,738 | 11/1964 | Okamura | 179—100.2 |
| 3,213,204 | 10/1965 | Okamura | 179—100.2 |

BERNARD KONICK, *Primary Examiner.*

J. R. GOUDEAU, P. ROTH, *Assistant Examiners.*